INVENTOR.
DAVID M. TENNISWOOD
BY
John R. Faulkner
Robert E. McCollum
ATTORNEYS

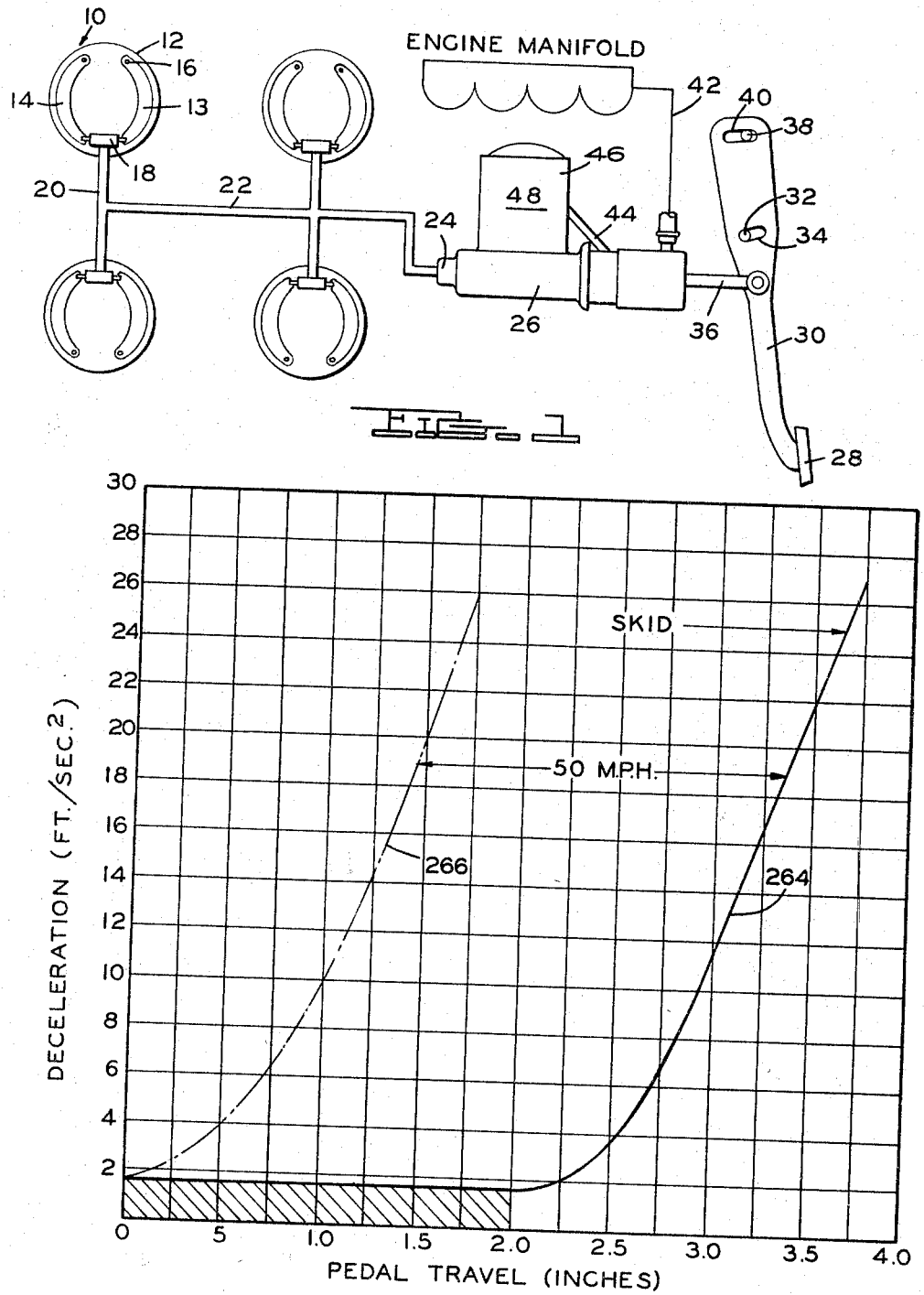

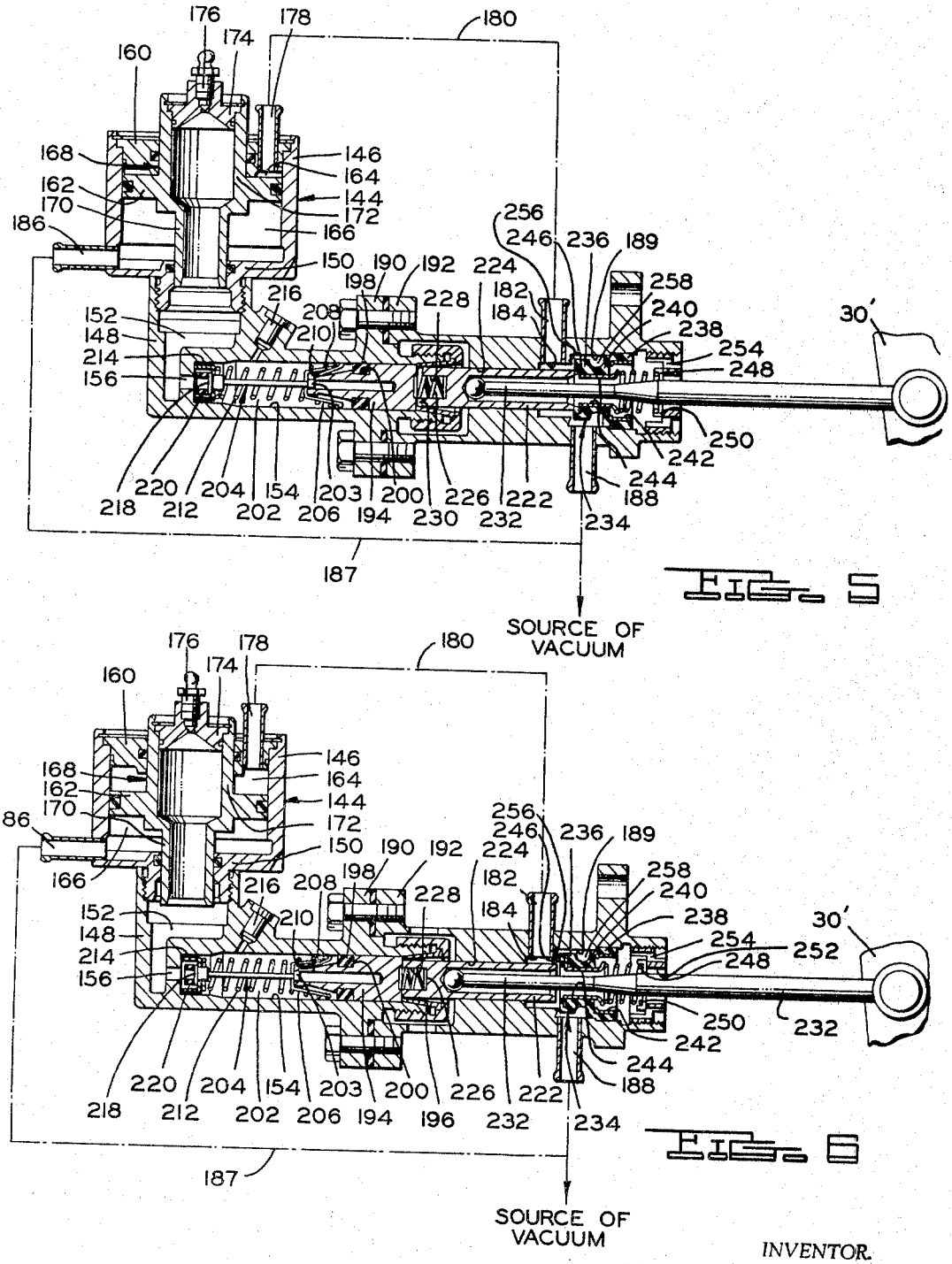

United States Patent Office 3,321,918
Patented May 30, 1967

3,321,918
MOTOR VEHICLE BRAKE PRECHARGE
SYSTEM
David M. Tenniswood, Detroit, Mich., assignor to the Ford Motor Company, Dearborn, Mich., a corporation of Delaware
Filed July 2, 1965, Ser. No. 469,264
10 Claims. (Cl. 60—54.6)

This invention relates to a motor vehicle braking system. More particularly, it relates to one in which initial movement of the brake pedal precharges the system to condition the brakes for immediate application upon further travel of the brake pedal.

Power brakes for motor vehicles are well known and used rather extensively. In general, such systems are over-sensitive at lower vehicle speeds, and especially during parking maneuvers. This is due to a number of reasons, one of which is that much greater power is available at these time than is needed.

During conventional braking operation, approximately 60% of the foot pedal travel is used to take up the slack in the wheel cylinder seals, compensation, moving the brake shoes out to the drums, and the over-all spring rate of the system. Both time and pedal travel are wasted during this operation before any vehicle deceleration occurs.

This invention is directed to a motor vehicle braking assembly that eliminates the objections to present power brake systems while retaining the advantages of a power booster brake system. In general, the assembly includes a brake fluid reservoir that is precharged by a fluid motor during the first increment of travel of the vehicle brake pedal, the rise in pressure level being reflected immediately at the wheel cylinders by a taking up of the slack in the system to condition the brakes for immediate application upon further movement of the brake pedal. The invention thus conditions the brake system for a deceleration of the vehicle after only a small increment of pedal travel, in contrast to prior known braking systems in which a pedal travel of approximately 60% of the full pedal movement is necessary before deceleration occurs.

One of the objects of the invention, therefore, is to provide a motor braking system with a precharging mechanism that permits the vehicle brakes to be applied after only a minuscule travel of the brake pedal, thus considerably reducing the foot pedal travel required. For example, the system is conditioned to begin deceleration of the vehicle after the brake pedal has moved approximately only .030 inch. In many known braking systems, the brake pedal may have a full travel of 3½ inches, and move approximately 2 inches before any deceleration of the vehicle, this 2 inches being necessary to take up the slack in the system.

It is another object of the invention to provide a precharging braking system that is simple in construction and economical to manufacture, and one that reduces the brake pedal travel.

A further object of the invention is to provide a braking system that includes means to pressurize the fluid reservoir and the fluid in the master cylinder chamber and the brake wheel cylinders almost simultaneous with depression of the brake pedal to immediately condition the system for deceleration of the vehicle.

A still further object of the invention is to provide a braking system that includes a fluid reservoir connected to a master cylinder chamber having a piston slidable in it to displace fluid under pressure to the wheel cylinders; a fluid motor for pressurizing the fluid in the reservoir and, therefore, in the master cylinder chamber, to a level eliminating the slack in the braking system; a sequence or scheduling valve for controlling a supply of air or vacuum to the fluid motor to activate it to pressurize the fluid reservoir; and a brake pedal connected to the master cylinder piston and sequence valve in a manner to permit movement of the valve in response to the first increment of travel of the brake pedal to activate the fluid motor and precharge the braking system immediately so that the wheel cylinders will be conditioned to provide immediate deceleration of the vehicle upon subsequent movement of the brake pedal moving the master cylinder piston to increase the pressure in the chamber and at the wheel cylinders.

Another object of the invention is to provide a braking system of the type described in which the master cylinder piston cooperates with a one-way seal that permits the reservoir fluid motor to precharge the system to the level sufficient to take up the slack in the system as soon as the brake pedal is depressed, but prevents return of fluid from the master cylinder chamber into the reservoir until the braking operation is over.

Another object of the invention is to provide a braking system of the type described in which a force transmitting plunger between the brake pedal and master cylinder piston is initially separated from the piston so that the first increment of pedal travel required to take up the clearance activates the sequence valve to render the fluid motor operative to precharge the system without moving the master cylinder piston.

Other objects, features and advantages of the invention will become apparent upon reference to the succeeding, detailed description thereof, and to the drawings illustrating the preferred embodiments thereof; wherein, FIGURE 1 schematically represents a motor vehicle braking system constructed according to the invention;

FIGURE 2 graphically illustrates the changes in motor vehicle deceleration versus pedal travel for the braking system of the invention and known braking systems;

FIGURE 5 is a cross-sectional view of another embodiment, with the parts in brake pedal released positions; and FIGURE 6 is a view corresponding to FIGURE 5 illustrating the parts thereof in system precharged positions.

Figure 3:
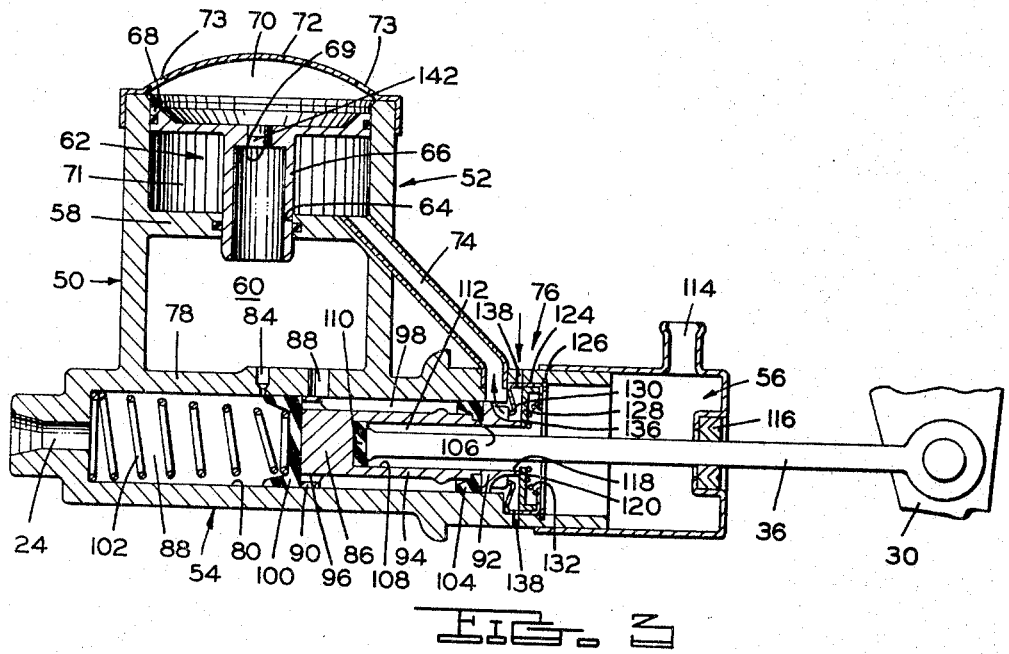
FIGURE 3 is an enlarged cross-sectional view of one embodiment of the master cylinder assembly of FIGURE 1, with the parts in brake pedal released positions.

FIGURE 1 schematically illustrates a braking system constructed according to the invention. It includes a fluid pressure actuated mechanical friction brake 10 for each wheel, which in this case is four. The brake per se is of a known construction and includes a drum or outer housing 12 secured to the wheel and cooperating with a pair of arcuately movable primary and secondary brake shoes 13 and 14. The shoes are pivotally mounted at one end 16 against a stationary anchor pin, and loosely biased inwardly at their opposite ends against the ends of the plungers of a wheel cylinder 18. The wheel cylinders are actuated by fluid under pressure supplied from lines 20 and 22 connected to a high pressure outlet 24 from a brake master cylinder assembly 26. The master cylinder assembly translates the foot effort of an operator applied to a brake pedal 28 into a high pressure fluid force that varies in general as a function of the change in foot effort by the operator.

The brake pedal, in this instance, is mounted on a lever 30 pivotally mounted on a primary pin 32 by a lost motion slot 34. The lever has a pivotal connection to a master cylinder piston rod 36 at a point between pin 32 and pedal 28 providing the desired mechanical advantage to reduce the effort needed to apply the vehicle brakes.

Lever 30 is also mounted on a secondary pivot pin 38 through a lost motion slot 40. This secondary pivot becomes the primary pivot upon a failure in the master cylinder system precharger, as will be described in more detail later.

In general, the first increment of travel of brake pedal 28 moves rod 36 to the left. This causes a sequence or scheduling valve associated with the master cylinder assembly 26 to admit vacuum from an engine intake manifold vacuum line 42 to a line 44 leading to a fluid motor 46. The fluid motor is above a brake fluid reservoir 48, and pressurizes the fluid in the reservoir and in the master cylinder and line 22 to precharge the braking system to a level sufficient to take up the slack in the system. This immediately prepares the system for deceleration of the vehicle upon further movement of brake pedal 28.

In the event that a break should occur in vacuum line 42, or the vacuum system suddenly becomes inoperative for other reasons, secondary pivot 38 becomes the primary pivot to provide additional mechanical advantage so that the brakes can still be applied by the operator without tremendously increasing the force required.

That is, if the vacuum system fails, further depression of brake pedal 28 moves lever 30 about pin 32 until the pin is abutted by the end of slot 34, at which point secondary pivot pin 38 will also be abutted by the left edge of slot 40. The secondary pivot pin now becomes the primary pivot for the brake lever. The specific location and distances between the pivot pins are such that when pin 38 takes over this function, the mechanical advantage will be sufficient to permit the operator to fully apply the vehicle brakes to decelerate the vehicle.

FIGURE 3, which is essentially to scale, shows the details of a master cylinder assembly constructed according to the invention. A main housing 50 defines a cylindrical reservoir portion 52, a master cylinder portion 54, and a vacuum tank 56. A partition 58 separates portion 52 into a brake fluid reservoir 60 and a fluid motor chamber 62. The partition has an opening 64 through which slides the hollow stem portion 66 of a piston 68. The piston further divides chamber 62 into upper and lower compartments 70 and 71. The upper compartment is closed by a cap 72 having a number of air holes 73 that always maintain the compartment at atmospheric pressure. Chamber 71, however, is alternately maintained at or below atmospheric pressure, depending upon the pressure of the air in a tube 74 connected to the chamber. The tube is controlled at its opposite end by an air/vacuum sequencing or scheduling valve mechanism 76 that will be described in more detail later.

Master cylinder section 54 is separated from reservoir 60 by a cylindrical wall 78. The wall defines an internal bore 80 that is connected at one end to the high pressure fluid outlet 24 (also see FIGURE 1). Reservoir 60 supplies the system with brake fluid through inlet and compensating ports 82 and 84 in wall 78. Compensating port 84 is restricted, and at times provides for make-up of fluid losses in the system, as will become clearer later.

A piston 86 is slidably mounted in bore 80, and defines a variable volume fluid chamber 88. The piston is of the spool type, and has enlarged diameter end lands 90 and 92 connected by a neck portion 94 of reduced diameter. Land 90 has a number of circumferentially spaced axial fluid ports or passages 96 that permit communication of brake fluid from the annular fluid chamber 98 surrounding neck portion 94 into chamber 88. A known type of one-way primary cup seal 100 abuts the face of land 90 to permit free flow of fluid from chamber 98 into chamber 88, while preventing return flow in the opposite direction. A spring 102 biases the seal into seating engagement with land 90, and urges both to the right. A secondary one-way cup seal 104 is seated in a groove 106 in neck portion 94 adjacent the face of land 92, and prevents flow of fluid from inlet 82 into line 74.

Piston 94 is adapted to be moved to the left by operating rod 36 (also see FIGURE 1), which is inserted in an enlarged bore 108 in the piston, and abuts a rubber reaction member 110. The diameter of rod 36 is smaller than the bore to provide a fluid annulus 112 between the two that connects with the vacuum reservoir or tank 56. The tank is secured to the end of the master cylinder housing, and connects with the engine intake manifold line 42 through a port 114. Rod 36 projects through a seal 116 in the end of tank 56, and is connected to brake lever 30, as previously described.

The right end 118 of piston land 92 is milled to provide a seat 120 for the sequencing valve mechanism 76. The valve mechanism includes an annular member 124 that is generally U-shaped in cross section. It is axially located at one edge against a snap ring 126, and at the opposite edge against a projecting portion 128 of tube 74. A second washer-like seal member 128 fits within member 124 and projects inwardly to a position to seat at times against edge 120 of piston land 92.

Member 128 is urged towards piston seat 120, and against a bend 130 in member 124 in a fluid sealing manner by a spring 132. The spring is seated between the depending leg portion 134 of member 124 and a disc 136 abutting the right face of member 128. A number of cooperating ports 138 are provided in the master cylinder wall 78 and the outer peripheral portion of member 124 for admitting air at atmospheric or ambient pressure into the annular space 140 between members 124 and 128.

*Operation*

FIGURE 3 shows the parts when the braking system is inoperative. The system is initially filled with a suitable brake fluid through a removable filler plug 142 in piston 68. The master cylinder chamber spring 102 initially positions piston 94 as shown between the compensating and inlet ports 84 and 82. This moves the right-hand edge 120 of piston 94 against the inner edge of seal member 128 to close the vacuum inlet port between the two and thereby prevent vacuum in tank 56 from acting on tube 74 and chamber 71. This also forces seal member 128 to the right against the force of spring 132, separating it from the bend 130 of seal member 124. Air at atmospherical pressure thus can enter through ports 138, pass between members 124 and 128, and through the now open space between piston edge 120 and seal 128, into tube 74 to maintain lower chamber 71 filled with air at ambient or atmospheric pressure. Upper chamber 70, of course, is at atmospheric pressure due to apertures 73 in cap 72. Since both chambers 70 and 71 are at the same pressure, and the residual pressure of the fluid in reservoir 60 at this time is zero or atmospheric, piston 68 will remain in the position shown. In practice, once the system is in operation, when the brake pedal is released, the declining residual pressure in reservoir 60 acting on the stem area 69 will return piston 68 to the position shown.

Once the vehicle engine has been started, the engine intake manifold vacuum in line 42 will evacuate tank 56 to the same pressure level. However, since piston edge 120 seats against member 128, vacuum cannot communicate with tube 74. If the brake pedal 28 were to be depressed at this time, the very first increment of travel of lever 30 moves rod 36 to the left of that shown in FIGURE 3, moving piston edge 120 in the same direction. This progressive leftward movement immediately permits valve spring 132 to bias member 128 into sealing contact with bend 130 of member 124 to seal off the air inlet port between the two. As soon as member 128 bottoms against bend 130, further leftward movement of piston 94 opens the vacuum port between edge 120 and member 128 to subject tube 74 and chamber 71 to the vacuum in tank 56. This reduces the pressure in chamber 71 to that present in the vacuum reservoir and engine intake manifold. Accordingly, the air pressure acting on top of piston 68 is now sufficient to depress the piston and begin displacing brake fluid from reservoir 60 through the inlet and compensating ports 82 and 84 into master cylinder chamber 88. Although the primary cup seal 100 by this time may cover port 84, it permits flow past the seal into chamber 88, while blocking return flow.

Figure 4:
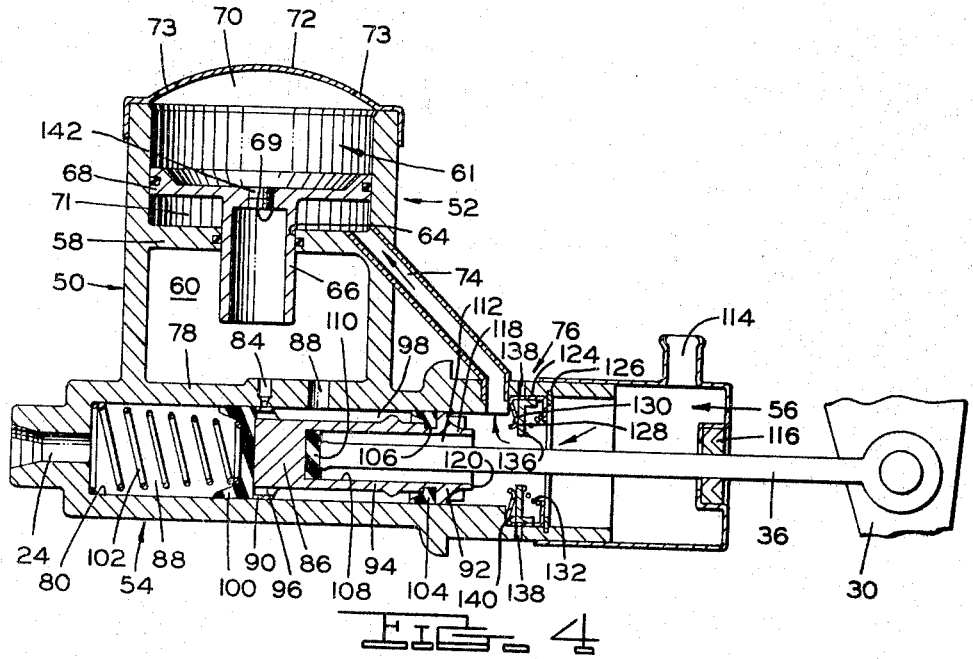
FIGURE 4 is a cross-sectional view corresponding to FIGURE 3, illustrating the parts thereof in a system precharged condition.

Since the brake fluid is substantially non-compressible, the continued displacement of fluid as piston 68 moves down will cause a pressure build-up in the system that is calculated to be sufficient (say 100 p.s.i., for example) to take up the slack in the system, before piston 68 bottoms out. The pressure level in the system at this time, therefore, is just short of the pressure level necessary to decelerate the vehicle. The wheel cylinders are now in a condition to immediately apply the brakes upon any further increase in pressure in the system. FIGURE 4 shows the master cylinder parts in this precharged position.

It will be appreciated, of course, that the action described above is almost instantaneous with depression of brake pedal 28; that is, the entire precharging operation occurs after only approximately .030 inch of foot pedal travel, for example. Continued depression of the brake pedal, therefore, now progressively moves piston 94 to the left, thereby further increasing the pressure in master cylinder chamber 88 and at the wheel cylinders, port 84 now being closed. The brakes will now be applied, and the vehicle will be decelerated with a force that is proportional to the continued force applied by the operator to brake pedal 28.

When the vehicle deceleration desired has been obtained, and the operator releases the brake pedal, master cylinder spring 102 and the residual pressure in chamber 88 immediately moves piston 94 to the right. As soon as piston end 120 abuts seal member 128, the vacuum port between the two will be closed. Further rightward movement immediately moves member 128 away from bend 130 of member 124 and opens the air inlet port between the two.

Lower chamber 71 now is open to air at atmospheric pressure through tube 74. The force of the residual pressure in reservoir 60 acting on piston area 69 is now sufficiently higher than the air pressure acting on the same area in chamber 70 so that piston 68 is returned to the FIGURE 3 position. The master cylinder piston 94 will also return to the position shown in FIGURE 3, uncovering compensating port 84 so that additional brake fluid can now be added to the system to make up for leakage losses that may have occurred during the braking operation.

It will thus be seen that the braking system of the invention provides a parallel circuit operation; that is, a first power operated precharging phase pressurizing the fluid in the reservoir and wheel cylinders upon initial minuscule movement of brake pedal 28, and a second phase providing further increase in the pressure in the braking system by action of the master cylinder piston movement. Thus, after only a fractional percentage of the total pedal travel, the system is immediately conditioned for actuation of the vehicle brakes. This can best be seen by referring to FIGURE 2, which compares the pedal travel of the assembly of this invention to those of conventional systems with the amount of pedal travel required to provide the desired vehicle deceleration forces.

FIGURES 5 and 6 show another embodiment of the invention, the basic construction and operation, however, being substantially the same as that shown and described in connection with FIGURES 3 and 4. As shown in FIGURE 5, the master cylinder assembly again includes a cylindrical reservoir portion 144 and a master cylinder portion 145. In this case, portion 144 has two different diameter cylindrical sections 146 and 148 separated by an apertured partition 150. Lower section 148 constitutes a brake fluid reservoir 152, and is connected to the end of the master cylinder bore 154 by a fluid compensating port 156. The upper section 146 is closed by a cover 160, and contains the fluid motor piston 162. The piston divides upper section 146 into upper and lower compartments 164 and 166, and is integral with a tubular pressure sensitive stem member 168. The lower reduced diameter portion 170 of stem member 168 is slidable through the lower wall of section 146 into fluid reservoir 152. The upper stem portion 172 projects slidably and sealingly through cover 160, and is closed by a cap 174 having a fill plug 176.

Compartment 164 is connected by a tube 178 through cover 160 to an air-vacuum line 180. This line connects through a tube 182 to an enlarged diameter portion 184 of master cylinder bore 154. Compartment 166 is connected by a tube 186 and a line 187 in parallel to a vacuum source, as indicated, and through a tube 188 to a second larger diameter portion 189 of master cylinder bore 154.

The rest position of precharge piston 162 is shown in FIGURE 5. The diameters, dimensions and proportions of the parts are such that when both chambers 164 and 166 are subjected to intake manifold vacuum, piston 162 will remain in the position shown. This is due to the fact that ambient air is acting on the outer area of piston stem cap 174, which, together with the force of the vacuum acting on the upper face of piston 162, will be less than the combined forces of the vacuum acting on the lower piston face area and the residual pressure of the brake fluid in reservoir 152 acting through the hollow stem of member 172 on the lower face of cap 174. In this particular instance, when the brake system is filled, the residual pressure in reservoir 152 is approximately 18 p.s.i.

The master cylinder housing 145 has two parts 190 and 192 bolted together as shown. Section 190 contains the master cylinder piston 194 and the compensating port closing mechanism. Piston 194 is slidably mounted in bore 154 and located axially at one end against a tubular tapered stop 196 secured to a portion of the master cylinder body. A one-way flow cup seal member 198 is fitted in a groove 200 in the piston and prevents leakage of brake fluid past the piston from master cylinder chamber 202.

Piston 194 is centrally bored for slidably receiving the end 203 of a compensating port closure member 204. The end 203 is maintained in the piston bore by a cup-shaped retainer 206. The retainer has a flexible locking finger 208 that abuts a shoulder 210 on the stem end portion of piston 194. The retainer and piston are biased against the end of stop 196 by a spring 212. The spring is seated between a flange on the periphery of retainer 206 and an apertured cup-shaped seat 214 bearing against the end of the master cylinder bore. Seat 214 is apertured around its circumference to permit passage of fluid from reservoir 152 through compensating port 156 to a high pressure outlet 216 leading to the wheel cylinders.

The compensating port closure member 204 includes a disc portion 218 to which is bonded an annular seal member 220. The compensating port is closed off when piston 194 moves to the left under the action of the brake pedal, as will be described more fully later. Once the port is closed, further leftward movement of piston 194 causes the end 203 of the port closure member to slide into the piston bore.

Piston 194 is moved to the left by a valve operating plunger 222 that is slidable in a bore 224 of housing portion 192. A compression spring 226 is seated at one end in a recess 228 in the plunger, and at its other end against the back face of piston 194. It normally urges the two members apart to provide a small clearance 230 between the two, as shown in FIGURE 5. The plunger is also recessed at its opposite end for receiving the end of valve operating rod 232. The rod is pivotally connected to the brake lever 30' in the same manner as that shown in connection with FIGURES 1, 3 and 4.

Like the construction shown in FIGURES 3 and 4, the right end sleeve portion of plunger 222 is chamfered to act as a valve seat for the face of a flexible poppet valve type member 234. This member consists of an annular rubber-like member having axially spaced portions 236 and 238 connected by a thin neck portion 240. Portion 238 is fixed against a shoulder in the enlarged bore 189 of the master cylinder by an annular retainer 242. A tubular spring seat 244 supports portion 236, and has a flange 246 embedded in it. A spring 248 is seated between the retainer and a cup-shaped washer 250 loosely surrounding rod 232. The washer abuts a disc 252 fixed in the master cylinder bore. The disc has openings 254 for communicating the surrounding air at atmospheric or ambient pressure with the interior annulus 255 defined by the spring seat 244 and differential area between plunger 222 and rod 232.

Spring 248 urges portion 236 of the poppet assembly leftwardly against the end of plunger 222 to block the air inlet to tube 172. If the plunger has moved to the left, spring 248 urges portion 236 against a tapered seat 256 projecting from body portion 192 to block the vacuum inlet from tube 188 to tube 182 on the opposite side.

The annular chamber 258 between the wall of bore 189 and valve 234 is always connected to vacuum through tube 188. Chamber 260, between the wall of bore 184 and the outer plunger sleeve surface, is alternately connected to vacuum in chamber 258, or to the air in chamber 255.

In operation, the braking system of FIGURES 5 and 6 is initially filled with a suitable brake fluid until the residual pressure in reservoir 152 is approximately 18 p.s.i. This pressure will maintain precharge piston 162 in the position shown in FIGURE 5, which is the rest or inoperative position of the parts when the brake pedal is released. The master cylinder piston 194 will be biased against its stop 196 by spring 212, thus pulling the compensating port seal 220 to the right to permit make-up fluid to be supplied to the brake cylinders and system through port 216.

Spring 226, between the end face of piston 194 and the valve operating plunger 222, will maintain the two members separated by the clearance 230. This will seat the plunger against valve member 234 to close the air port between the two and move it away from seat 256, thereby opening the vacuum port between the two. Both springs 212 and 226 also, of course, position the brake pedal 28 in its released position.

With the parts positioned as shown in FIGURE 5, once the engine begins operating, vacuum from the intake manifold, for example, is admitted to valve chamber 258 to act through tubes 182 and 188 on both chambers 164 and 166 of the fluid motor. Air cannot enter line 180 since plunger 222 is seated against the rubber seal 234.

When vehicle deceleration is desired, the operator depresses the brake pedal to move rod 232 to the left. Immediately, this force is transmitted to the valve operating plunger 222 to progressively compress spring 226 without moving piston 194. This leftward movement permits spring 248 to move the poppet valve 234 to the left to seat it against the cylinder body seat 256 and close the vacuum port. Continued leftward movement of plunger 222 to a position where it unseats from member 234 and abuts piston 194 opens the atmospheric port, as shown in FIGURE 6. Thus, air at ambient pressure can enter tube 182 and be applied to the upper fluid motor chamber 164 to act on the upper face of piston 162. This immediately causes a downward movement of the piston, and results in brake fluid being displaced from reservoir 152 throughout the brake system to provide a pressure build up to approximately 100 p.s.i., which is sufficient to take up the slack in the system.

As stated previously, this precharging of the system occurs almost instantaneously upon depression of the brake pedal inasmuch as only a minute pedal travel of .030 inch, for example, is necessary to accomplish it. The system is now conditioned for application of the brakes upon continued depression of the brake pedal. The continued brake pedal movement now directly moves master cylinder piston 194 to the left, first to seat seal member 220 over compensating port 156, and subsequently to further compress spring 212 and raise the pressure in the brake system sufficient to decelerate the vehicle.

It will be seen, therefore, that the application of the brakes and the precharging of the system is accomplished in substantially the same manner as described in connection with the FIGURES 3 and 4 embodiments.

When the amount of vehicle deceleration desired has been reached, the operator releases the brake pedal. The force of springs 212 and 226, and the residual pressure in the brake system in chamber 202, will immediately move master cylinder piston 194 to the right to seat it against its stop 196. This also, of course, will open compensating port 156. The movement of plunger 222 to the right abuts the end of the plunger against the face of valve 234 to first seal the atmospheric port, and then open the vacuum port by moving the seal further to the right and away from seat 256. This now permits vacuum to again act through tube 182 on upper fluid motor chamber 164 to permit the residual pressure in reservoir 152 to return the piston to the position shown in FIGURE 5. The compensating port now being open permits a make-up of any loss of fluid that may have been occasioned by leakage in the system. Once again, the system will be ready for actuation by the operator, and the pressure in reservoir 152 will decay to approximately 18 p.s.i.

From the foregoing, it will be seen that the invention provides a braking system that is simple and economical to manufacture, while providing all of the advantages of power booster brake systems. It does this by providing a fluid motor to pressurize the brake fluid reservoir, as soon as the brake pedal is actuated, to take up the slack in the system and condition the brakes for immediate application. Also, it does this with considerably less foot pedal travel than known brake systems, as is shown more clearly in FIGURE 2.

In a conventional brake system, the brake pedal must be depressed approximately 3½ to 4 inches to obtain total braking effort at low speeds of the vehicle, for example. As is shown, approximately 60% of this pedal travel is used merely to take up the slack in the system. This is indicated by the straight portion of curve 264 before any any deceleration occurs. Curve 266 indicates the amount of pedal travel for the same conditions provided by the master cylinder assembly constructed according to the invention. It will be seen that due to the precharging of the braking system during the first incremental movement of the brake pedal, that approximately two inches of brake pedal travel is eliminated while obtaining full braking effort.

While the invention has been illustrated in its preferred embodiments in the drawings, it will be clear to those skilled in the arts to which the invention pertains, that many changes and modifications may be made thereto without departing from the scope of the invention.

I claim:

1. A precharger for a hydraulic braking system for a motor vehicle having wheel brake cylinders for applying wheel brakes, comprising, a master cylinder having a fluid chamber connected to said wheel cylinders and containing a piston movable therein to transmit fluid under pressure to said brake cylinders, a fluid reservoir, fluid port means connecting said reservoir and said master cylinder, first means for moving said piston, fluid operated motor means operable on the fluid in said reservoir to displace the same through said port means into said chamber and wheel cylinders to pressurize the same to a predetermined level preparatory to application of said wheel brakes, a source of fluid under presure, conduit means connecting said source to said motor means for operating said motor means, and second means in said conduit means operably connected to and responsive to initial movement of said first means for controlling the flow of fluid to said motor means to pressurize the fluid in said reservoir, subsequent movement of said first means moving said piston to a position increasing the pressure of the fluid to said brake cylinders to apply said vehicle brakes, said piston having means preventing return flow of fluid through said port means from said chamber upon movement of said piston in a pressure increasing direction, a brake lever pivotally connected near its midpoint to said first means and having a pedal portion adjacent one end, and primary and secondary lever pivot means between the opposite end of said lever and the point of pivotal connection to said first means, said primary and secondary lever pivot means being so constructed and arranged that said lever pivots about said primary pivot means as long as said pressurizing means is operative and said lever pivots first about said primary pivot means and subsequently about said secondary pivot means upon failure of said presusrizing means, to increase the mechanical advantage thereof.

2. A hydraulic braking system as in claim 1, said primary and secondary lever pivot means each comprising a pin and elongated slot connection wherein one of the members of the connection is stationary.

3. A hydraulic braking system as in claim 2, said primary and secondary lever pivot means each comprising an elongated slot in said lever slidably receiving a stationary pin therein, said pins being essentially vertically aligned.

4. A hydraulic braking system for a motor vehicle having wheel cylinder actuated brakes, including, a brake pedal, a master cylinder having a chamber containing fluid, a fluid reservoir, said chamber having a fluid inlet connected to said reservoir and a fluid outlet connected to said wheel cylinders, piston means slidable within said chamber for displacement of the fluid therein to said wheel cylinders, plunger means between said pedal and piston means for moving said piston means, a fluid pressure differentially operated power means for displacing the fluid in said reservoir into said chamber and to said wheel cylinders, means for subjecting opposite sides of said power means to fluid at the same pressure, a source of fluid at a different pressure connectable to one side of said power means for creating a pressure differential thereacross to effect a movement of said power means to displace said reservoir fluid into said wheel cylinders, and valve means operably connected to said source for controlling the supply of fluid at said different pressure to said power means, said valve means being actuatable by said plunger means to a position communicating said different pressure fluid to said power means upon initial movement of said plunger means in one direction to displace said reservoir fluid into said wheel cylinders and precharge the fluid therein to a predetermined pressure level lower than the level necessary for application of said wheel brakes, the subsequent further movement of said plunger means in said one direction moving said master cylinder piston to increase the fluid pressure in said chamber and brake cylinders to apply said brakes said brake pedal comprising a brake lever pivotally connected near its midpoint to said plunger means and having a pedal portion adjacent one end, and primary and secondary lever pivot means between the opposite end of said lever and the point of pivotal connection to said plunger means, said primary and secondary lever pivot means being so constructed and arranged that said lever pivots about said primary pivot means as long as said power means is operative and said lever pivots first about said primary pivot means and subsequently about said secondary pivot means upon failure of said power means, to increase the mechanical advantage thereof.

5. A hydraulic braking system for a motor vehicle having wheel brake cylinders, comprising, a master cylinder having a piston movable therein to transmit fluid under pressure to said brake cylinders, said piston defining a fluid chamber between one end thereof and an end of said cylinder, a fluid reservoir, passage means connecting said reservoir and said chamber, conduit means connecting said end of said cylinder to said wheel cylinders, a one-way flow sealing member in said chamber connected to said piston, a brake pedal operated plunger means connected to said piston, fluid pressure operated power piston means operable at times on the fluid in said reservoir to pressurize the same and displace it through said passage means into said chamber and wheel cylinders to precharge said system to a predetermined level prior to application of said brakes, a source of fluid under pressure, conduit means connecting said source to said power piston means, and valve means in said conduit means movable to a flow blocking or unblocking position, said valve means being operably connected to and responsive to initial movement of said plunger means for movement to a flow unblocking position to effect actuation of said power piston means to pressurize the fluid in said brake cylinders to said predetermined level, said initial movement of said plunger means moving said master cylinder piston and sealing member to a position preventing return flow of fluid through said passage means from said chamber, subsequent movement of said plunger means moving said master cylinder piston to increase the pressure of the fluid at said brake cylinders to apply said brakes, said brake pedal comprising a brake lever pivotally connected near its midpoint to said plunger means and having a pedal portion adjacent one end, and primary and secondary lever pivot means between the opposite end of said lever and the point of pivotal connection to said plunger means, said primary and secondary lever pivot means being so constructed and arranged that said lever pivots about said primary pivot means as long as said power means is operative and said lever pivots first about said primary pivot means and subsequently about said secondary pivot means upon failure of said power means, to increase the mechanical advantage thereof.

6. A hydraulic braking system for a motor vehicle having wheel brake cylinders, comprising, a master cylinder having a piston movable therein to transmit fluid under pressure to said brake cylinders, said piston defining a fluid chamber between one end thereof and an end of said cylinder, a fluid reservoir, passage means connecting said reservoir and said chamber, conduit means connecting said end of said cylinder to said wheel cylinders, a one-way flow sealing member in said chamber connected to said piston, a brake pedal operated plunger means connected to said piston, fluid pressure operated power piston means operable at times on the fluid in said reservoir to pressurize the same and displace it through said passage means into said chamber and wheel cylinders to precharge said system to a predetermined level prior to application of said brakes, a source of fluid under pressure, conduit means connecting said source to said power piston means, and valve means in said conduit means movable to a flow blocking or unblocking position, said valve means being operably connected to and responsive to initial movement of said plunger means for movement to a flow unblocking position to effect actuation of said power piston means to pressurize the fluid in said brake cylinders to said predetermined level, spring means between said plunger means and master cylinder piston initially separating the two, the initial movement of said plunger means compressing said yieldable means without moving said master cylinder piston, subsequent movement of said plunger means moving said master cylinder piston to increase the pressure of the fluid at said brake cylinders to apply said brakes.

7. A hydraulic braking system for a motor vehicle having wheel brake cylinders, comprising, a master cylinder having a piston movable therein to transmit fluid under pressure to said brake cylinders, said piston defining a fluid chamber between one end thereof and an end of said cylinder, a fluid reservoir, passage means connecting said reservoir and said chamber, conduit means connecting said end of said cylinder to said wheel cylinders, a one-way flow sealing member in said chamber connected to said piston, a brake pedal operated plunger means connected to said piston, fluid pressure operated power piston means operable at times on the fluid in said reservoir to pressurize the same and displace it through said passage means into said chamber and wheel cylinders to precharge said system to a predetermined level prior to application of said brakes, a source of fluid under pressure, conduit means connecting said source to said power piston means, and valve means in said conduit means movable to a flow blocking or unblocking position, said valve means being operably connected to and responsive to initial movement of said plunger means for movement to a flow unblocking position to effect actuation of said power piston means to pressurize the fluid in said brake cylinders to said predetermined level, lost motion means between said plunger means and master cylinder piston permitting an initial clearance between the two, the initial movement of said plunger means taking up the clearance of said lost motion means without moving said master cylinder piston, subsequent movement of said plunger means moving said master cylinder piston to increase the pressure of the fluid at said brake cylinders to apply said brakes.

8. A hydraulic braking system for a motor vehicle having wheel cylinders for applying the vehicle brakes, comprising, a master cylinder connected to said wheel cylinders and having a piston movable therein to transmit fluid under pressure to said brake cylinders, a fluid reservoir at ambient pressure, fluid passage means connecting said reservoir and said master cylinder, a brake pedal, plunger means connecting said pedal and piston for moving said piston in a pressure increasing direction, and an air balanced fluid motor pressurizing means operable on the fluid in said reservoir to increase the pressure of the fluid therein and in said master and wheel cylinders to a predetermined level that is lower than the level necessary to actuate said brakes, a source of vacuum connected to one side of said motor to create a pressure differential therein to actuate said motor to pressurize the reservoir fluid, and valve means operably connected to said source of vacuum to control the flow thereof and movable by and in response to initial movement of said plunger means for connecting said vacuum to said motor for rendering said pressurizing means operable, subsequent movement of said plunger means moving said piston to a position increasing the pressure of the fluid in said master and brake cylinders to apply said brakes, said piston including means for preventing return flow of fluid through said passage means upon movement of said piston in said one direction, a brake lever pivotally connected near its midpoint to said first means and having said brake pedal thereon adjacent one end, and primary and secondary lever pivot means between the opposite end of said lever and the point of pivotal connection to said plunger means, said primary and secondary lever pivot means being so constructed and arranged that said lever pivots about said primary pivot means as long as said fluid motor is operative and said lever pivots first about said primary pivot means and subsequently about said secondary pivot means upon failure of said fluid motor, to increase the mechanical advantage thereof.

9. A hydraulic braking system for a motor vehicle having wheel cylinders for applying the vehicle brakes, comprising, a master cylinder connected to said wheel cylinders and having a piston movable therein to transmit fluid under pressure to said brake cylinders, a fluid reservoir, passage means connecting said reservoir and said master cylinder, plunger means for moving said piston in a pressure increasing direction, an air motor pressurizing means having a piston operable at times on the fluid in said reservoir to increase the pressure of the fluid in said master and wheel cylinders to a predetermined level that is lower than the level necessary to actuate said brakes, a source of air, a source of vacuum, means connecting said air to opposite sides of said motor piston and said vacuum to one side of said motor piston, and valve means in said last-mentioned means movable to one position whereby air is supplied to said motor piston and to a second position whereby vacuum is supplied to said one side of said motor piston to cause movement of said latter piston to pressurize the fluid in said reservoir, said valve means being operably connected to and responsive to initial movement of said plunger means for movement of said valve means from its first position to its second position for rendering said air motor means operable, subsequent movement of said plunger means moving said master cylinder piston to a position increasing the pressure of the fluid in said master and brake cylinders to apply said brakes, said master cylinder piston including means for preventing return flow of fluid through said passage means upon movement of said latter piston in said one direction.

10. A hydraulic braking system for a motor vehicle having wheel cylinders for applying the vehicle brakes, comprising, a master cylinder connected to said wheel cylinders and having a piston movable therein to transmit fluid under pressure to said brake cylinders, a fluid reservoir, passage means connecting said reservoir and said master cylinder, plunger means for moving said piston in a pressure increasing direction, means between said piston and plunger means providing an initial clearance therebetween, a vacuum balanced motor pressurizing means having a piston operable at times on the fluid in said reservoir to increase the pressure of the fluid in said master and wheel cylinders to a predetermined level that is lower than the level necessary to actuate said brakes, a source of air, a source of vacuum, conduit means connecting said vacuum to opposite sides of said motor piston and air to one side of said motor piston, and valve means in said conduit means movable to one position whereby vacuum is supplied to said motor piston and to a second position whereby air is supplied to said one side of said motor piston to cause movement of said latter piston to pressurize the fluid in said reservoir, said valve means being operably connected to and responsive to initial movement of said plunger means for movement of said valve means from its first position to its second position for rendering said air motor operable, the initial movement of said plunger means taking up said clearance to abut said master cylinder piston, subsequent movement of said plunger means moving said master cylinder piston to a position increasing the pressure of the fluid in said master and brake cylinders to apply said brakes, said master cylinder piston including means movable therewith for blocking return flow of fluid through said passage means upon movement of said latter piston in said one direction.

References Cited
UNITED STATES PATENTS

| | | | |
|---|---|---|---|
| 2,058,063 | 10/1936 | Cox | 60—54.6 |
| 2,095,752 | 10/1937 | La Brie | 60—54.6 |
| 2,197,126 | 4/1940 | Dick | 60—54.6 X |
| 3,099,500 | 7/1963 | Anderson | 303—49 |

MARTIN P. SCHWADRON, *Primary Examiner.*

ROBERT R. BUNEVICH, *Examiner.*